No. 861,628. PATENTED JULY 30, 1907.
I. ANDERSON.
METHOD OF RECOVERING PRECIOUS METALS FROM SOLUTIONS.
APPLICATION FILED AUG. 8, 1906.
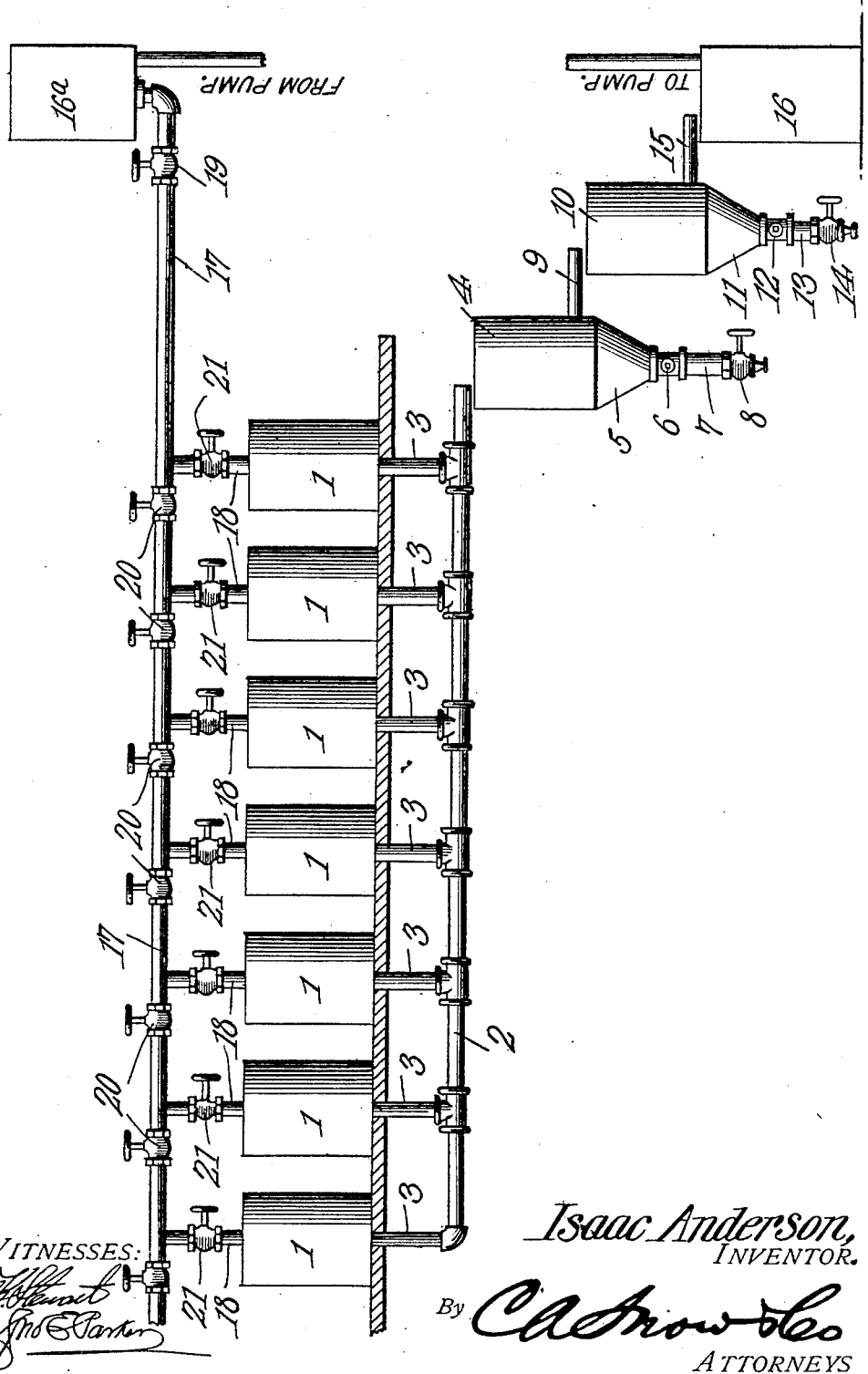

UNITED STATES PATENT OFFICE.

ISAAC ANDERSON, OF McCABE, ARIZONA TERRITORY, ASSIGNOR OF ONE-HALF TO SAMUEL A. WHIPPLE, OF McCABE, ARIZONA TERRITORY.

METHOD OF RECOVERING PRECIOUS METALS FROM SOLUTIONS.

No. 861,628.      Specification of Letters Patent.      Patented July 30, 1907.

Application filed August 8, 1906. Serial No. 329,761.

*To all whom it may concern:*

Be it known that I, ISAAC ANDERSON, a citizen of the United States, residing at McCabe, in the county of Yavapai and Territory of Arizona, have invented a new and useful Method of Recovering Precious Metals from Solutions, of which the following is a specification.

This invention relates to methods of recovering precious metals from solutions, and has special reference to an improved process of recovering gold, silver and copper from solutions in which they are held by means of cyanid of potassium.

The principal object of the invention is to provide an improved method by which the gold, silver and copper may be precipitated in such manner as to clear the solution and permit regeneration at small expense in order to render the same fit for further use.

A further object of the invention is to permit the treatment of pulp containing a large percentage of copper, in such manner as to secure all of the gold and silver values, provision being made for subjecting the fresh pulp to the action of solutions already carrying gold and silver in order that a large percentage of copper may first be removed from the fresh pulp, the solution being then regenerated after precipitation and used in the treatment of the pulp from which most of the copper has been removed.

With these and other objects in view, the invention consists in the novel method of recovering precious metals from cyanid solutions, hereinafter described and claimed.

In the treatment of gold and silver bearing ore in which a large percentage of copper is present, some difficulty is found in the recovery of the precious metal, particularly the silver, owing to the fact that the cyanid solution becomes heavily charged with copper. It is well known that potassium cyanid has a greater affinity for gold than for copper, and a greater affinity for copper than for silver in the same state of fineness, and in ordinary practice the potassium cyanid will combine first with the gold and then with the copper, and after becoming heavily charged will not take up any silver unless a further quantity of potassium cyanid is added. This is especially the case where the pulp is well treated with lime. This will be better appreciated when it is understood that the cyanid solution will take up forty per cent of its own weight in copper, and if the solution is once loaded with the copper, no silver values can be obtained.

In carrying out the invention I prefer to employ the apparatus illustrated in the accompanying drawing, the apparatus being the same as that shown in my Letters-Patent of the United States granted to me on December 27, 1904, No. 778,348.

In the drawing, 1 1 1 1 1 1 designate pulp vats of any desirable character, in which the leaching of the pulverized ores with potassium cyanid solution may be carried on in any ordinary or preferred manner. Beneath the pulp vats 1 extends a conduit 2, into which all of the pulp vats discharge through outlet pipes 3, and the conduit 2 conveys the solution obtained by leaching the ore in the pulp vats. All of the solution passes along the conduit to precipitation vat 4, which is preferably of ordinary form in the upper part and provided with a tapering bottom 5, in the middle of which is fixed a valve 6 over a chamber 7, at the bottom of which is a second valve 8. A pipe 9 leads from the bottom portion of the precipitation vat 4 to a cyanid recovery vat 10, which is supported at a lower level than the precipitation vat. The cyanid recovery vat is of substantially the same construction as the precipitation vat, being provided with a tapering bottom 11, and valve 12 in the tapering bottom, a receiving chamber 13 beneath the valve 12, and a discharge valve 14 at the bottom of the chamber. A pipe 15 leads from the lower portion of the vat 10 into a sump tank 16 into which the regenerated cyanid solution is allowed to flow and from which it will be pumped to a tank 16$^a$ for storage. The tank 16$^a$ is supported at a higher level than the pulp vats, and it discharges through a conduit 17, which extends over the pulp vat and has branches 18 leading thereinto. A valve 19 is provided in the conduit 17 adjacent to the storage tank 16$^a$, and similar valves 20 are provided at intervals throughout the length of the conduit just beyond the points of divergence of the branch pipes 18. Valves 21 are provided in the branch pipes 18 also, and the set of valves 19, 20 and 21 form means whereby the flow of the cyanid solution from the tank 16$^a$ into any or all of the pulp vats may be regulated as desired.

In carrying out my improved method of recovering values from solution by means of the apparatus described, the solution obtained by leaching the ore in the pulp vats will be allowed to flow into the precipitation tank, the valve 6 being closed. Sulfuric acid is then added to the solution, and the mixture is thoroughly agitated to cause decomposition of the soluble double cyanids containing the precious metals and the copper. These are precipitated to the bottom of the tank, after which the valve 6 is opened to allow the precipitate to pass into the chamber 7, the valve 8 being closed. The precipitate having passed into the chamber 7 the valve 6 will be closed and the valve 8 opened to discharge the precipitate into suitable receptacles in which it may be conveyed away for treatment in any preferred manner to cover the precipitate in metallic form. The liquid remaining in the vat 4 after the removal of the precipitate will then be allowed to pass through the pipe 9 into the cyanid regeneration tank 10, the valve 12 of which will be closed. The solution having been transferred into the vat 10, lime of sufficient quantity to combine with all of the sulfuric acid is introduced into the solution forming a precipitate of calcium sulfate, while the potassium previously in combination therewith will recombine with the hydrocyanic acid present to form potassium cyanid. The calcium sulfate formed by the addition of lime to the solution will settle in the bottom of the tank 10 and may be allowed to pass into the chamber 13 by opening the valve 12. When the calcium sulfate has passed into the chamber 13, the valve 12 will be closed and the valve 14 opened to discharge the precipitated calcium sulfate, while the regenerated cyanid solution flows into the sump tank 10 from which it is pumped as required to the storage tank $16^a$.

When dealing with a pulp that contains sulfates of copper and the cyanid solution contains gold and silver, the operator will add to the solution fresh pulp in order that the solution may carry off the soluble copper of the fresh pulp. The metals are then precipitated and the cyanid solution after being regenerated is again allowed to act on the pulp from which most of the copper has been removed, so that the regenerated solution will take up practically all of the gold and silver values of the pulp last added. When the solution has taken up the gold and silver values, possibly another quantity of pulp is added in order that the partly saturated solution may take up the bulk of the copper and the operation proceeds as before. In this manner the bulk of the copper is removed by a sulution already saturated with gold and silver, and the remaining precious metals may be more thoroughly taken up by the regenerated cyanid solution than is possible where there is but a single treatment.

In carrying out the invention it is not necessary to add either chlorids or sulfids for the reason that the precipitation will occur when sulfuric acid is added, whether these be present or not.

The copper causes better precipitation of the gold and silver than do the sulfids or chlorids, and also helps to precipitate the sulfur from the cyanid solution. It has also the advantage of giving a better weight to the precipitates so that the turbid solution is more quickly clarified.

I claim:—

1. The herein described method of recovering metals from pulp containing precious metals and copper, consisting in extracting from fresh pulp the bulk of the copper contained therein by treating the same with a cyanid solution containing precious metals, and then precipitating the said precious metals and copper from the cyanid solution by treating the charged solution with sulfuric acid.

2. The herein described method of recovering precious metals from pulp containing a large percentage of copper, consisting in first treating the pulp with potassium cyanid, then precipitating the extracted metals with sulfuric acid, then neutralizing the acid and thereby regenerating the solution, and then again subjecting the pulp to the action of the regenerated cyanid solution.

3. The herein described method of recovering precious metals from pulp containing a large percentage of copper, consisting in first treating the pulp with potassium cyanid, then precipitating the extracted metals with sulfuric acid, then neutralizing the sulfuric acid and thereby regenerating the solution, then again subjecting the pulp to the action of the regenerated solution, and, finally, treating fresh pulp with the solution.

In testimony that I claim the foregoing as my own, I have hereto affixed my signature in the presence of two witnesses.

ISAAC ANDERSON.

Witnesses:
   JNO. GALLAGHER,
   HUGH BURNS.